(12) United States Patent
Schuller et al.

(10) Patent No.: US 9,851,911 B1
(45) Date of Patent: Dec. 26, 2017

(54) DYNAMIC DISTRIBUTION OF REPLICATED DATA

(71) Applicant: Twitter, Inc., San Francisco, CA (US)

(72) Inventors: Peter Schuller, San Francisco, CA (US); Christopher Goffinet, San Francisco, CA (US); Sangjin Lee, San Francisco, CA (US); Meher Anand, San Francisco, CA (US); Edward Ceasar, San Francisco, CA (US); Armond Bigian, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/096,987

(22) Filed: Apr. 12, 2016

Related U.S. Application Data

(63) Continuation of application No. 14/637,212, filed on Mar. 3, 2015, now Pat. No. 9,342,250, which is a continuation of application No. 14/056,107, filed on Oct. 17, 2013, now Pat. No. 9,003,086.

(60) Provisional application No. 61/719,367, filed on Oct. 27, 2012.

(51) Int. Cl.
| | |
|---|---|
| *G06F 13/42* | (2006.01) |
| *G06F 3/06* | (2006.01) |
| *G06F 13/00* | (2006.01) |

(52) U.S. Cl.
CPC ............ *G06F 3/0619* (2013.01); *G06F 3/065* (2013.01); *G06F 3/067* (2013.01)

(58) Field of Classification Search
CPC .......... G06F 12/08; G06F 12/00; G06F 13/00; G06F 2003/00; G06F 13/4282; G06F 13/385; G06F 13/4022; G06F 13/4045

USPC .............................. 710/62, 15; 709/226, 214
See application file for complete search history.

(56) References Cited

U.S. PATENT DOCUMENTS

| | | | |
|---|---|---|---|
| 5,581,764 A | 12/1996 | Fitzgerald et al. | |
| 7,676,551 B1 | 3/2010 | Dalia et al. | |
| 8,201,001 B2 | 6/2012 | McKean et al. | |
| 8,612,616 B2 | 12/2013 | Koning et al. | |
| 9,003,086 B1 * | 4/2015 | Schuller ................ | G06F 3/0613 |
| | | | 709/226 |
| 2008/0147878 A1 | 6/2008 | Kottomtharayil et al. | |
| 2010/0010456 A1 | 1/2010 | Najafi et al. | |
| 2012/0016994 A1 | 1/2012 | Nakamura et al. | |

(Continued)

OTHER PUBLICATIONS

Weil et al., "CRUSH: Controlled, Scalable, Decentralized Placement of Replicated Data", University of California, Santa Cruz (12 pages).

*Primary Examiner* — Christopher Shin
(74) *Attorney, Agent, or Firm* — Fish & Richardson P.C.

(57) ABSTRACT

A system and method for data storage. The method can include: identifying, by a computer processor, a cluster map representing a set of storage resources; for each storage resource of the set of storage resources: traversing, by the computer processor, the cluster map to map the storage resource to a candidate resource set including at least one other storage resource of the set of storage resources; identifying a first data object associated with a storage request; identifying a first candidate resource set based on the first data object; and selecting a first final resource set based at least on the first candidate resource set, where the first data object is sent to storage resources of the first final resource set for storage.

19 Claims, 10 Drawing Sheets

(56) References Cited

U.S. PATENT DOCUMENTS

| | | |
|---|---|---|
| 2012/0265935 A1 | 10/2012 | Luo |
| 2013/0268644 A1 | 10/2013 | Hardin et al. |
| 2014/0012994 A1 | 1/2014 | Kottomtharayil et al. |
| 2014/0013322 A1 | 1/2014 | Freimuth et al. |
| 2014/0244841 A1 | 8/2014 | Gulati et al. |

* cited by examiner

| Storage Resource | Candidate Resource Set |
|---|---|
| 234431 | 393734, 676789, 117340 |
| 837374 | 965433, 374557, 967610 |
| 389948 | 092238, 103309, 675400 |
| ... | ... |
| 678786 | 897662, 212908, 667912 |

FIG. 7A

| Virtual Bucket | Primary Storage Resource |
|---|---|
| 1 | 234431 |
| 2 | 837374 |
| 3 | 389948 |
| ... | ... |
| 100000 | 678786 |

FIG. 7B

DYNAMIC DISTRIBUTION OF REPLICATED DATA

CROSS-REFERENCE TO RELATED APPLICATIONS

This application is a continuation of U.S. patent application Ser. No. 14/637,212 filed Mar. 3, 2015, now U.S. Pat. No. 9,342,250, which is a continuation of U.S. patent application Ser. No. 14/056,107, filed Oct. 10, 2013, now U.S. Pat. No. 9,003,086. This application claims benefit of U.S. Provisional Patent Application No. 61/719,367, filed on Oct. 27, 2012 and entitled "Dynamic Distribution of Replicated Data." U.S. Provisional Patent Application No. 61/719,367 is incorporated by reference herein, in its entirety, for all purposes.

BACKGROUND

There are many factors to consider when designing a distributed data storage system. Modern distributed storage systems provide varying levels of data replication and can provide a high measure of protection against data loss in the event of hardware failure. Increasing the replication factor (RF) and reliability of the system can greatly increase the associated hardware and operating costs of a system. Various different mechanisms have been developed to reduce these costs while limiting the potential impact on competing requirements such as reliability and performance.

Traditionally, a data distribution algorithm is used to map data to one or more nodes of the storage system for storage. This mapping of the data can result in a single node sharing data with any number of other nodes, and can have a significant impact on the probability of data loss in the event of a hardware or software failure. Should a failure occur, the storage system may be required to restore and re-allocate at least some of the stored data from other nodes. Rebalancing of the data among the remaining nodes can have a significant performance impact.

It is the objective of designers to maintain performance, reliability, and cost constraints under normal operation conditions, as well as under high-load and failure scenarios.

SUMMARY

In general, in one aspect, the invention relates to a method for data storage. The method includes: identifying, by a computer processor, a cluster map representing a set of storage resources; obtaining a resource distribution factor (RDF) value; for each storage resource of the set of storage resources: traversing, by the computer processor, the cluster map to map the storage resource to a candidate resource set including at least one other storage resource of the set of storage resources, wherein the RDF value is correlated with a size of the candidate resource set; identifying a first data object associated with a storage request; identifying a first candidate resource set based on the first data object; and selecting a first final resource set based at least on the first candidate resource set, where the first data object is sent to storage resources of the first final resource set for storage.

In general, in one aspect, the invention relates to a distributed storage system. The system includes: a computer processor; a cluster map representing a set of storage resources; a distribution engine executing on the computer processor and configured to obtain a resource distribution factor (RDF) value, for each storage resource of the set of storage resources, traverse the cluster map to map the storage resource to a candidate resource set including at least one other storage resource of the set of storage resources, wherein the RDF value is correlated with a size of the candidate resource set; and a frontend module configured to receive a request to store a first data object, identify a first candidate resource set based on the first data object, select a first final resource set based at least on the first candidate resource set, and provide the first data object to be stored on each storage resource of the first final resource set for storage.

In general, in one aspect, the invention relates to a non-transitory computer readable medium including computer readable program code for: identifying a cluster map representing a set of storage resources; obtaining a resource distribution factor (RDF) value; for each storage resource of the set of storage resources: traversing the cluster map to map the storage resource to a candidate resource set including at least one other storage resource of the set of storage resources, wherein the RDF value is correlated with a size of the candidate resource set; identifying a first data object associated with a storage request; identifying a first candidate resource set based on the first data object; and selecting a first final resource set based at least on the first candidate resource set, where the first data object is sent to storage resources of the first final resource set for storage.

Other aspects of the invention will be apparent from the following description and the appended claims.

BRIEF DESCRIPTION OF DRAWINGS

FIG. 7A shows an example of mappings between storage resources and candidate resource sets in accordance with one or more embodiments of the invention.

FIG. 7B shows an example of mappings between virtual buckets and primary storage resources in accordance with one or more embodiments of the invention.

DETAILED DESCRIPTION

Figure 1:
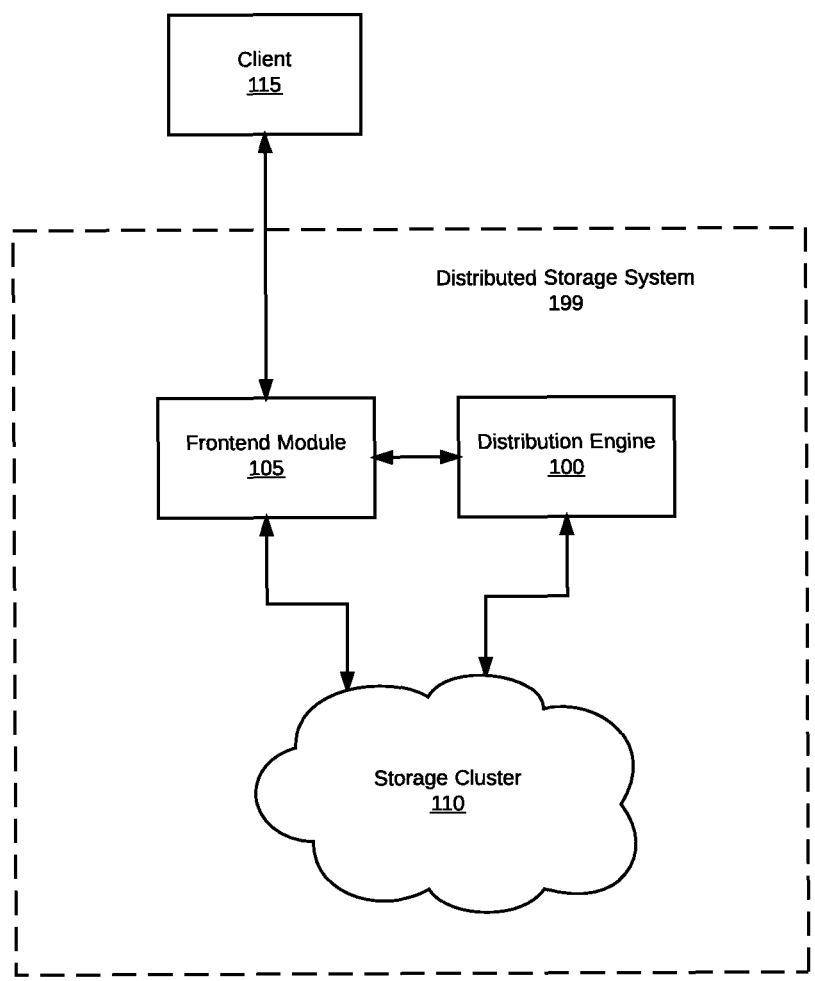
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for distributed data storage. A data distribution algorithm for selecting one or more storage resources is identified. For each storage resource in a storage cluster, the data distribution algorithm is used to identify a candidate resource set. A set of virtual buckets is identified and each virtual bucket is mapped to a primary storage resource (e.g., based on a modification to the data distribution algorithm).

In one or more embodiments of the invention, the data distribution algorithm is modified to map each virtual bucket to a subset of the candidate resource set corresponding to the primary storage resource. The subset and the primary storage resource may be referred to collectively as the final resource set. Thus, each virtual bucket may be mapped to a final resource set which is used to store data associated with the virtual bucket.

In one or more embodiments of the invention, each data object from a storage request is mapped to one of the virtual buckets. The primary storage resource and the candidate resource set of that virtual bucket are then identified. In one or more embodiments of the invention, the data distribution algorithm is modified to map the data object to a subset of the candidate resource set. Thus, in these embodiments, data objects corresponding to the same virtual bucket may be mapped to different storage resources among the same candidate resource set.

FIG. 1 shows a system in accordance with one or more embodiments of the invention. As shown in FIG. 1, the system has multiple components including a client (115) and a distributed storage system (199) include a distribution engine (100), a frontend module (105), and a storage cluster (110). Various components of the distributed storage system (199) may be located on the same device (e.g., a server, mainframe, personal computer (PC), and any other device) or may be located on separate devices connected by a network (e.g. a local area network (LAN), the Internet, etc.), with wired and/or wireless segments. Those skilled in the art will appreciate that there may be more than one of each separate component running on a device, as well as any combination of these components within a given embodiment of the invention.

In one or more embodiments of the invention, the distribution engine (100) includes functionality to utilize a data distribution algorithm to identify one or more storage resources for distributed storage of a data object. The data object may refer to any amount, segment, or portion of data designated for storage in the storage cluster (110). Multiple iterations of the data distribution algorithm may be performed. For example, the Controlled Replication Under Scalable Hashing (CRUSH) algorithm (Weil) represents a topology of a distributed storage system as a hierarchical cluster tree. In one or more embodiments of the invention, the distribution engine (100) is configured to perform multiple traversals of the hierarchical cluster tree using various different inputs, in order to identify one or more storage resources.

Traditionally, data distribution algorithms are used to determine where a data object should be stored in the storage cluster. Thus, traditional data distribution algorithms simply take an identifier of a data object as input and output a set of storage resources for storing replicas of the data object.

In one or more embodiments of the invention, the distribution engine (100) includes functionality to modify inputs to the data distribution algorithm and/or a cluster map used by the data distribution algorithm in order to limit or reduce the number of nodes which can potentially share data with a given node in the storage cluster (110). In other words, given that the traditional usage of a data distribution algorithm can result in the theoretical possibility of a given node in the storage cluster (110) sharing data with a large number of other nodes (i.e., a high RDF value), the distribution engine (100) includes functionality to reduce the RDF value by making modifications to the inputs and data used by the data distribution algorithm. The cluster map is a data structure representing the topology of at least a portion of the storage cluster (110). Various data distribution algorithm(s) may be used, in accordance with one or more embodiments of the invention. For purposes of this disclosure, a "traversal" or "iteration" of the data distribution algorithm may refer to one or more calculations involving a usage of the data distribution algorithm, in accordance with various embodiments of the invention. Similarly, a "traversal" or "iteration" of the cluster map may refer to any calculation(s) involving a usage of the cluster map, in accordance with various embodiments of the invention.

In one or more embodiments of the invention, the distribution engine (100) includes functionality to identify a replica distribution factor (RDF). The RDF represents the number of nodes in the storage cluster (110) which can potentially share data with a given node. Thus, for purposes of this disclosure, an RDF value is any numerical representation of potential effect(s) of a node's failure on other nodes in the system. For example, the RDF may be an indication of how many other nodes can be affected by the failure of a node in the system. Various different formulas or methods of calculating an RDF value can be used, in accordance with various embodiments of the invention. Some systems having a low RDF value are less stable against topology changes, since there are greater restrictions on how and where a given piece of data can be redistributed. In other words, in some systems, small changes in topology may require disproportionally larger mapping changes to be made. In an ideal scenario, any change in the topology would result in a proportional mapping change. As a result, many existing data distribution algorithms result in an effective RDF value equal to the number of nodes in the cluster. In other words, if all nodes in a cluster of size N share some part of data from any given node, then RDF is also equal to N.

In one or more embodiments of the invention, the probability of data loss can be approximated by the formula $RDF \times p^{RF-1}$, where p is the estimated probability that any node fails during a given time window. It is evident that, as the replication factor is lowered, the importance of the RDF value increases with regard to the probability of suffering data loss.

Thus, in one or more embodiments of the invention, the RDF may be a numerical value which equals, is proportional to, and/or is associated with the maximum number of storage resources in the storage cluster which can share data with a given storage resource. The distribution engine (100) may be configured to receive the RDF value from a user (e.g., an administrator), as part of a storage request, as a predefined value by a designer of the storage cluster, and/or from any other source, in accordance with various embodiments of the invention.

In one or more embodiments of the invention, the distribution engine (100) includes functionality to use the RDF value and an identifier of a storage resource as inputs to the data distribution algorithm to map each storage resource of the storage cluster (110) to a candidate resource set. The distribution engine (100) may be configured to perform an iteration of the data distribution algorithm in order to deterministically identify the candidate resource set. The candidate resource set represents the set of storage resources which can potentially share data with the storage resource (also referred to as the primary storage resource). The size of the candidate resource set may be equal to or otherwise correlated with the RDF value, in accordance with various embodiments of the invention.

Figure 2:
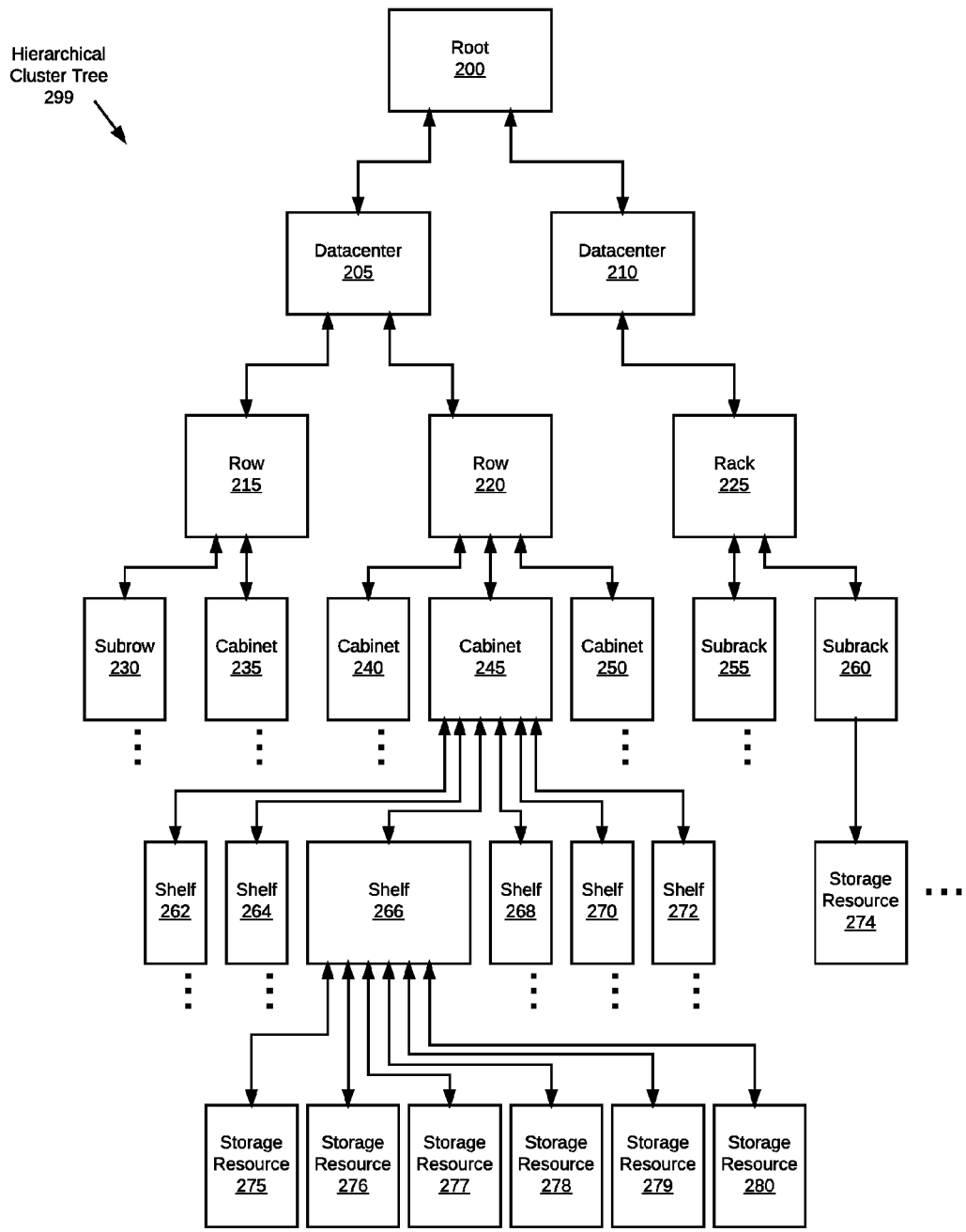
FIG. 2 shows an example of a hierarchical cluster tree in accordance with one or more embodiments of the invention.

FIG. 2 shows an example of a hierarchical cluster tree (299) in accordance with one or more embodiments of the invention. As shown in FIG. 2, the hierarchical cluster tree (299) has one or more multiple nodes representing components of a distributed storage system including one or more data centers (e.g., 205, 210), one or more rows (e.g., 215, 220), one or more subrows (e.g., 230), one or more cabinets (e.g., 235, 240, 245, 250), one or more racks (e.g., 225), one or more subracks (e.g., 255, 260), one or more shelves (e.g., 262, 264, 266, 268, 270, 272), one or more storage resources (e.g., 274-280), and/or any other components included in or otherwise relevant to a distributed storage system, in accordance with various embodiments of the invention. One or more of the various components represented by the hierarchical cluster tree (299) may be located on the same device (e.g., a server, mainframe, a rack, etc.) or may be located on separate devices connected by a network (e.g. a local area network (LAN), the Internet, etc.), with wired and/or wireless segments. Those skilled in the art will appreciate that there may be more than one of each separate component running on a device, as well as any combination of these components within a given embodiment of the invention.

In one or more embodiments of the invention, the hierarchical cluster tree (299) is a type of cluster map. Thus, in this example, the hierarchical cluster tree (299) is a data structure representing a topology of the storage cluster (110) of FIG. 1. The exemplary hierarchical cluster tree (299) of FIG. 2 is not intended to be limiting, as each storage cluster may be organized according to a different set of hardware and software requirements and limitations. As a result, the nodes, the physical arrangement of the nodes, the naming and attributes of the different types of nodes, the placement rules, and/or the structure of the hierarchical cluster tree (299) may differ from the example shown, in accordance with various embodiments of the invention.

Returning to FIG. 1, in one or more embodiments of the invention, the distribution engine (100) includes functionality to traverse the cluster map (e.g., hierarchical cluster tree (299) of FIG. 2), based on the data distribution algorithm, to identify a candidate resource set for each storage resource. This may require a separate traversal for each storage resource using an identifier of the storage resource as input. For example, the distribution engine may use an identifier of the storage resource and an RDF value as an input to the CRUSH algorithm. Because the CRUSH algorithm may be modified to use any numerical value as an input, in this example, the distribution engine (100) is configured to perform a traversal of the hierarchical cluster tree to establish mappings between each storage resource and a corresponding candidate resource set. In this example, the RDF value represents the size of each candidate resource set plus one. Thus, the following formula is an example of the relationship between the RDF value and the size of the candidate resource set ($C_{size}$): RDF=$C_{size}$+1.

It should be noted that, in one or more embodiments of the invention, the usage of the hierarchical cluster tree is dependent upon the specific data distribution algorithm. Thus, any other type of cluster map representing one or more aspects of the topology of the storage cluster may be used instead of, or in addition to the hierarchical cluster tree, in accordance with various embodiments of the invention.

In one or more embodiments of the invention, the distribution engine (100) includes functionality to perform a traversal of the data distribution algorithm for each storage resource in the storage cluster, until all eligible storage resources are mapped to a candidate resource set.

Figure 3:
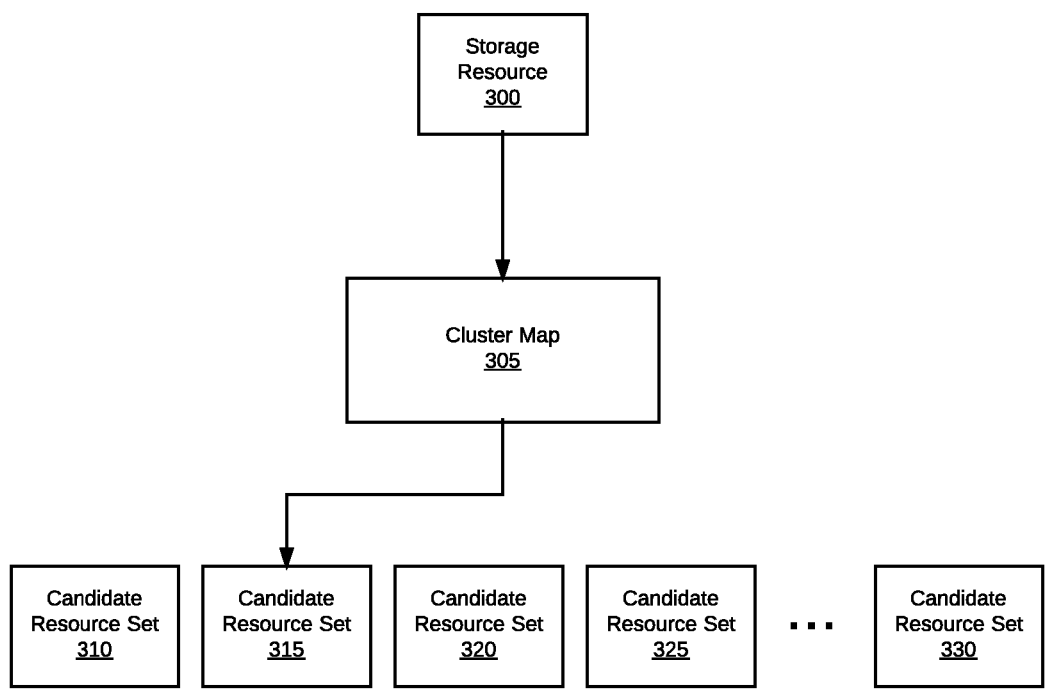
FIGS. 3, 4A, and 4B show data flow diagrams in accordance with one or more embodiments of the invention.

FIG. 3 shows an example of a data flow diagram in accordance with one or more embodiments of the invention. As shown in FIG. 3, the data flow diagram includes a storage resource (300), a cluster map (305), and a candidate resource set (310), in accordance with various embodiments of the invention.

As shown in FIG. 3, in one or more embodiments of the invention, a storage resource (300) is used as an input to the cluster map (305) in order to identify a candidate resource set (315). This may repeated until each storage resource in the storage cluster is mapped to a candidate resource set.

In one or more embodiments of the invention, the mapping of a storage resource to a candidate resource set is uni-directional. Thus, in the case of a uni-directional mapping, if a first storage resource is mapped to a candidate resource set including the second storage resource, the second storage resource need not be mapped to a candidate resource set including the first resource. In other words, the first storage resource need not be in the candidate resource set of the second storage resource.

In one or more embodiments of the invention, the mapping of a storage resource to a candidate resource set is bi-directional. Thus, in the case of a bi-directional mapping, if a first storage resource is mapped to a candidate resource set including a second storage resource, the second storage resource must be mapped to a candidate resource set including the first resource. In other words, the first storage resource is in the candidate resource set of the second storage resource.

Returning to FIG. 1, in one or more embodiments of the invention, the distribution engine (100) includes functionality to identify a set of virtual buckets. A virtual bucket may be any logical unit for categorizing data which is requested to be stored in the storage cluster (e.g., data object(s) included in a storage request). For example, the distribution engine (100) may be configured to create 100,000 virtual buckets for handling storage requests. In this example, each storage request is mapped to one of the virtual buckets. The mapping may be performed by using an identifier of the request and/or data as input to a hash function. In this example, an identifier of the virtual bucket is an output of the hash function. Any number of virtual buckets may be used, in accordance with various embodiments of the invention.

In one or more embodiments of the invention, the distribution engine (100) includes functionality to iterate the data distribution algorithm for each virtual bucket, in order to identify a primary storage resource. For example, an identifier of the virtual bucket is an input to the data distribution algorithm and the primary storage resource may be an output of the data distribution algorithm.

Figure 4A:
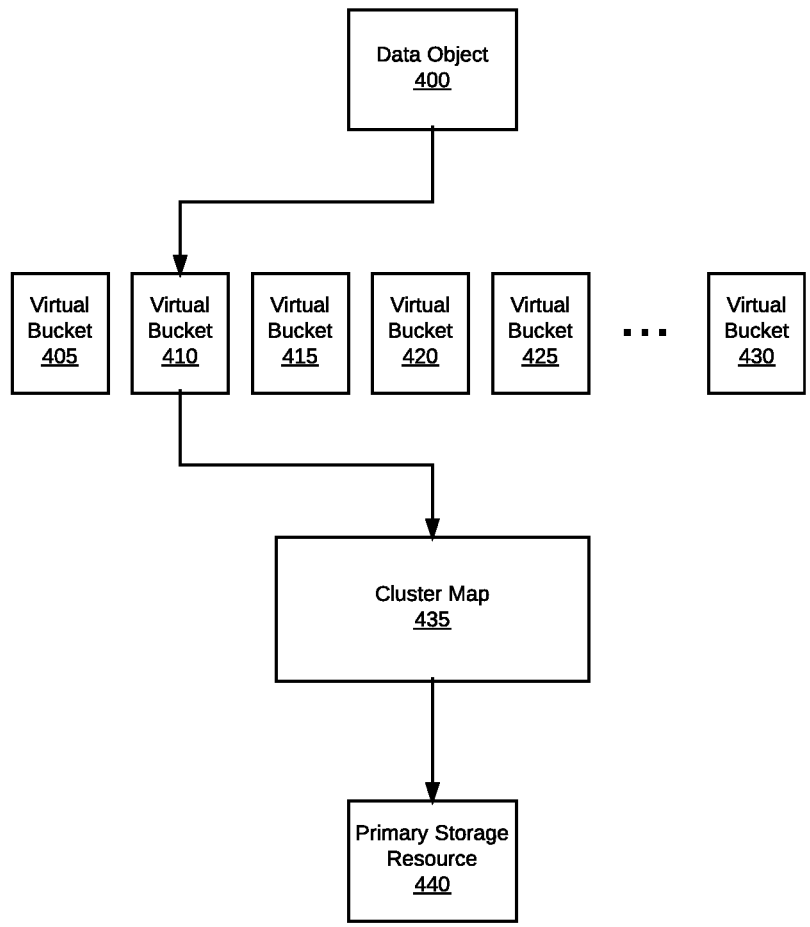

FIG. 4A shows an example of a data flow diagram in accordance with one or more embodiments of the invention. As shown in FIG. 4A, the data flow diagram includes a data object (400), a set of virtual buckets (405-430), a cluster map (435), and a primary storage resource (440), in accordance with various embodiments of the invention.

As shown in FIG. 4A, in one or more embodiments of the invention, a data object (400) associated with a request is mapped (e.g., hashed) to a virtual bucket (410). An identifier of the virtual bucket (410) is used as an input to a data distribution algorithm using the cluster map (435) in order to identify a primary storage resource (440). the example of FIG. 4A is not intended to depict a preferred or restricted order in which operations are performed. Thus, for example, the distribution engine of FIG. 1 may be configured to perform the mapping of virtual buckets to primary storage resources prior to, during, and/or after receiving a storage request including the data object (400).

Returning to FIG. 1, in one or more embodiments of the invention, the distribution engine (100) includes functionality to identify the candidate resource set associated with the primary storage resource. The distribution engine (100) may be configured to use an identifier of the primary storage resource and the RDF value as inputs to a data distribution algorithm in order to identify the candidate resource set. For example, the distribution engine (100) may use a predefined RDF value to restrict the size of the candidate resource set to n=RDF−1. Thus, in this example, each the primary storage resource plus its associated candidate resource set is equal in size to the RDF value. In one or more embodiments of the invention, the selection value (i.e., the number of requested storage resources) may be modified, depending on the requirements of the data distribution algorithm, to conform to the requested RDF.

Figure 4B:
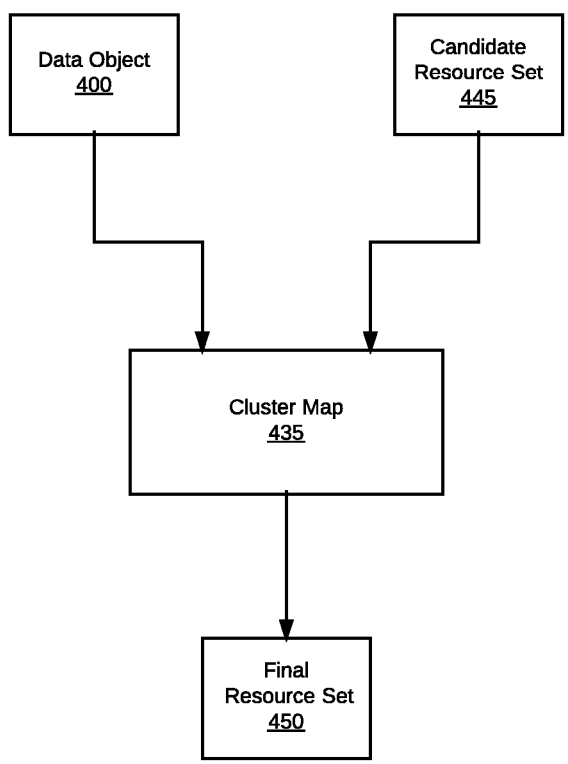

FIG. 4B shows an example of a data flow diagram in accordance with one or more embodiments of the invention. As shown in FIG. 4B, the data flow diagram includes the data object (400) and the cluster map (435) of FIG. 4A, as well as a candidate resource set (445), and a final resource set (450), in accordance with various embodiments of the invention.

As shown in FIG. 4B, in one or more embodiments of the invention, the data object (400) and the candidate resource set are used in conjunction with the cluster map (435) in order to identify a primary storage resource (440). The example of FIG. 4A is not intended to depict a preferred or restricted sequence in which operations are performed. Thus, for example, the distribution engine of FIG. 1 may be configured to perform a restricted traversal of the cluster map (435). In performing the restricted traversal, the distribution engine may initially create, by pruning storage resources from the cluster map (435), a modified cluster map representing only storage resources in the candidate resource set (445). Then, the distribution engine may be configured to use the modified cluster map to identify the final resource set (450). Alternatively, in one or more embodiments of the invention, the modified cluster map may be identified during the traversal of the original cluster map (435) in order to identify the final resource set (i.e., in a single pass). In the example of FIGS. 3, 4A, and 4B, the cluster map (435) may be any data structure representing the at least a portion of the topology of the storage cluster, depending on the data distribution algorithm, and in accordance with various embodiments of the invention.

Returning to FIG. 1, in one or more embodiments of the invention, the distribution engine (100) includes functionality to perform a restricted iteration of the data distribution algorithm which is limited to the storage resources in the candidate resource set. The distribution engine (100) may be configured to identify a data structure representing a modified topology of the storage cluster (110) prior to or while performing the restricted iteration. In one or more embodiments of the invention, the modified topology includes only storage resources in the candidate resource set, and specifically excludes (i.e., prunes) other storage resources in order to limit the selection of storage resources to the candidate resource set. For example, when using the CRUSH algorithm, a modified hierarchical cluster tree may be generated by removing storage nodes from the original hierarchical cluster tree which are not present in the candidate resource set. This modified hierarchical cluster tree may then be used to perform the restricted traversal.

In one or more embodiments of the invention, the distribution engine (100) includes functionality to perform the restricted iteration based on a replication factor and an identifier of the virtual bucket, in order to identify a subset of the candidate resource set for storing commonly mapped data (e.g., data mapped to a common virtual bucket). The primary storage resource and the identified subset of the candidate resource set are collectively referred to as the final resource set. The size of the final resource set may be equal to the replication factor, or may otherwise be correlated with the replication factor, in accordance with various embodiments of the invention. The distribution engine (100) may be configured to use the replication factor (RF) as an input identifying a number of storage resources to be selected in the restricted iteration. In one or more embodiments of the invention, given that the primary storage resource is already selected in a previous iteration of the data distribution algorithm, the distribution engine (100) is configured to select RF−1 additional storage resources from the candidate resource set. Thus, any variation of the replication factor may be used as input in order to achieve the desired number of storage resources in the final resource set. The distribution engine (100) may perform the restricted iteration in order to produce a mapping between the virtual bucket and a final resource set, in accordance with various embodiments of the invention.

In one or more embodiments of the invention, the distribution engine (100) includes functionality to identify a primary storage resource and to perform the restricted iteration for each virtual bucket, until every virtual bucket is mapped to a final resource set. Thus, the distribution engine (100) may be configured to pre-compute the mappings between virtual buckets and their corresponding final resource sets prior to receiving one or more data storage requests. In one or more embodiments of the invention, the distribution engine (100) is configured to update one or more of the mappings in response to a user request, a detected topology change, a change in the requested replication factor, a change in the requested RDF value, and/or any combination of inputs potentially affecting one or more of the mappings of virtual buckets to final resource sets.

In one or more embodiments of the invention, the frontend module (105) includes functionality to receive a request to store, read, and/or modify a data object. For purposes of this disclosure, the data object may be any data size, format, or type of data which is designated for replicated storage. The request may be received from a client (115), and may be processed in parallel with one or more other storage requests, in accordance with various embodiments of the invention. The client (115) may be any entity communicatively coupled to the distributed storage system (199). Examples of a client may include, but are not limited to, a software application, a service oriented architecture (SOA) storage service, a middleware application, an external computing device, a database management system (DBMS), a server application, and/or any other entity capable of submitting storage related requests to the distributed storage system (199).

In one or more embodiments of the invention, the frontend module (105) includes functionality to identify a virtual bucket based on an identifier of the data object. The distribution engine (100) may be configured to map the data object to the virtual bucket by using an identifier of the data object as an input to a hash function. In one or more embodiments of the invention, any deterministic function for mapping requests and/or data objects to virtual buckets may be used.

In one or more embodiments of the invention, the frontend module (105) includes functionality to identify the final resource set which is mapped to by the virtual bucket. The mapping of the virtual buckets to final resource sets may be stored in and retrieved from one or more distribution repositories (not shown) which are accessible to the distribution engine (100).

In one or more embodiments of the invention, the frontend module (105) includes functionality to send a replica of the data object to the storage resources of the final resource set for storage.

In one or more embodiments of the invention, the distribution engine (100) includes functionality to remove one or more storage resources from the cluster map based on one or target balance thresholds being reached. The target balance threshold may be a maximum number of mappings, a standard deviation corresponding to a distribution function, a predefined percentage of total mappings, and/or any other threshold for restricting the quantity of mappings (e.g., from virtual buckets and/or data objects) to each storage resource. For example, as the process for mapping virtual buckets to a primary storage resource and/or to a final resource set proceeds, the distribution engine (100) may track the number of mappings per storage resource. The distribution engine (100) may be configured to compare the number of mappings for a storage resource to a predefined maximum number. In this example, if the distribution engine (100) determines that the number of mappings for the storage resource exceeds the maximum number, the distribution engine (100) may then remove the storage resource from the cluster map for subsequent mappings and/or may reject the mapping and attempt to remap the virtual bucket or data object after removal of the storage resource from the cluster map. In one or more embodiments of the invention, the comparison of each storage resource to the target balance threshold may be performed at the time that each mapping is made, at one or more periodic events/times, in response to a trigger, in response to user input, in response to a rebalance of a data structure representing the topology, and/or at any other time during or after the process of mapping virtual buckets and/or data objects to one or more storage resources (e.g., at any time during the processes of FIGS. 5A, 5B, and 6, discussed below). In another example, the data distribution engine selects a storage resource to be included in the final resource set of a virtual bucket. In this example, a predefined maximum number of mappings of virtual buckets to a single storage resource is set to 200. After mapping the virtual bucket to the selected storage resource, the distribution engine determines that 200 virtual buckets are now mapped to that storage resource. In response to this determination, in this example, the distribution engine removes the storage resource from the cluster map for subsequent mappings. In one or more embodiments of the invention, making modifications to the cluster map (e.g., removing a storage resource) may involve creating a modified copy cluster map with the required changes.

In one or more embodiments of the invention, the distribution engine (100) includes functionality to select an alternate node in response to determining that a target balance threshold is exceeded. For example, using the CRUSH algorithm, the distribution engine may first remove an overloaded node from the hierarchical cluster tree after determining that a number of mappings to the node exceeds a predefined maximum number of mappings. Next, the distribution engine may re-traverse the hierarchical cluster tree and reach a parent of the overloaded node (i.e., due to the deterministic nature of CRUSH). The distribution algorithm may then select a different resource storage due to the absence of the overloaded node in the hierarchical cluster tree.

In one or more embodiments of the invention, the distribution engine (100) includes functionality to select one or more secondary storage resources based on an identifier of a data object. For example, the distribution engine (100) may first hash the data object to a virtual bucket and identify a primary storage resource associated with the virtual bucket. Then, rather than using a final resource set of the virtual bucket to store all data objects hashed to the same virtual bucket, the distribution engine (100) may be configured to use the identifier of each data object to select potentially different secondary storage resources from the candidate resource set for each data object. In this example, the distribution engine (100) identifies a candidate resource set of the primary storage resource and then uses a restricted iteration of the data distribution algorithm to identify a subset of the candidate resource set for storing the data object. In other words, the distribution engine (100) traverses a subset of the cluster map representing only the candidate resource set, using an identifier of the data object as input, to identify RF−1 secondary storage devices for storing replicas of the data object. Thus, data objects that map to the same virtual bucket will be stored within storage resources of the same candidate resource set, although potentially in different secondary storage resources. In this way, in one or more embodiments of the invention, the data object is used as an input to the distribution algorithm in order to select the specific secondary storage resources for each request. In one or more embodiments of the invention, the distribution engine (100) is configured to limit the number of data objects mapped to each storage resource using a target balance threshold (discussed above). If the target balance threshold is based on the mapping of individual data objects to storage resources, the distribution engine (100) may further be configured to detect that one or more storage resources has dropped below the target balance threshold (e.g., due to deletion of data) and to add the storage resource(s) back into the cluster map for subsequent mapping.

In one or more embodiments of the invention, the distribution engine (100) includes functionality to identify one or more placement rules. The distribution engine (100) may then use the placement rules to restrict the selection of storage resources according to various criteria. Examples of a placement rule may include, but are not limited to, a requirement that selected storage resources reside in different physical arrangements (e.g., cabinets, rows, racks, subracks, etc.), a requirement that a predefined number or percentage of the selected storage resources reside in a different or specified physical arrangement, a maximum number of storage resources with a common physical arrangement, and/or any other criteria or combination of criteria for selection among storage resources. The distribution engine (100) may be configured to use the placement rules to restrict or otherwise modify the iteration of the data distribution algorithm.

In one or more embodiments of the invention, the distribution engine (100) is a component of a software application or a set of related software applications configured to execute on one or more hardware processors. The distribution engine (100) may include one or more reader and/or writer threads configured to perform multiple concurrent iterations of one or more of the disclosed methods. In one or more embodiments of the invention, the distribution engine (100) is a component of a service-oriented architecture (SOA) application and may be configured to facilitate communication between one or more storage resources of the distributed storage system (199). One or more components of the distributed storage system (199) may reside in cloud computing application in a network distributed system and/or a personal computing device of a user. In one or more embodiments of the invention, the distribution engine (100) is integrated within or operatively connected to one or more other components of the distribution engine (100).

In one or more embodiments of the invention, the frontend module (105) is a component of a software application or a series of related software applications configured to communicate with external entities (e.g., client (115)). The frontend module (105) may include an application programming interface (API) and/or any number of other components used for communicating with entities outside of the distributed storage system (199). The API may include any number of specifications for making requests from and/or providing data to the distributed storage system (199). For example, functions provided by the API may perform read and/or write operations to the storage cluster. In one or more embodiments of the invention, each node within a distributed storage system (199) includes a frontend module (105) and a distribution engine (100). In this way, routing functionality of the distributed storage system (199) may be de-centralized. In other words, one or more distributed nodes of the storage system (199) may independently route storage requests to one or more other nodes of the storage system (199).

In one or more embodiments of the invention, the storage cluster (110) is a distributed system of storage resources. A storage resource may refer to a physical storage device and/or software/hardware configured to manage one or more physical storage devices (e.g., an SOA storage service executing on one or more servers coupled to the storage device(s)). Examples of a storage device may include, but are not limited to, a hard disk drive (HDD), a solid state drive (SSD), a redundant array of independent disks (RAID) drive, an optical disc drive (ODD), a flash memory device, and/or any other form of computer memory or combination thereof.

Figure 5A:
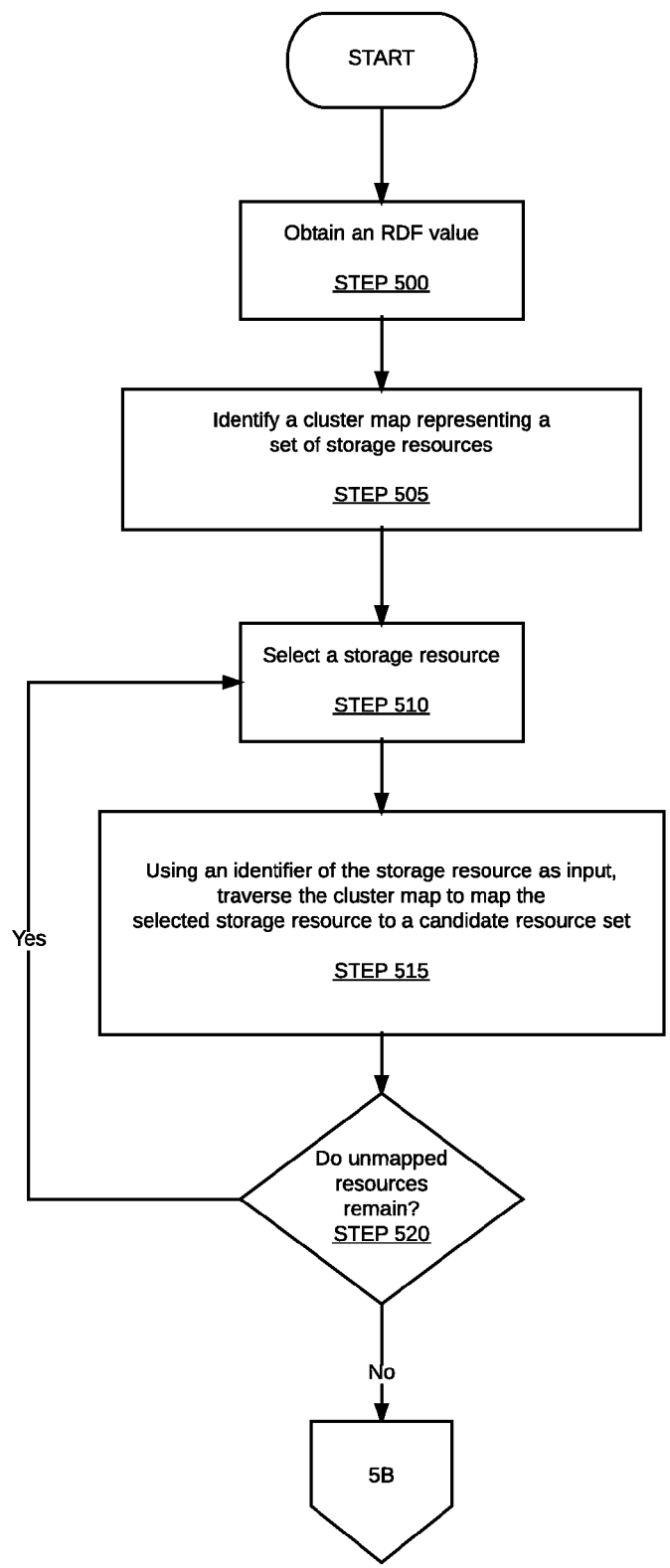
FIGS. 5A, 5B, and 6 show flowcharts in accordance with one or more embodiments of the invention.
Figure 5B:
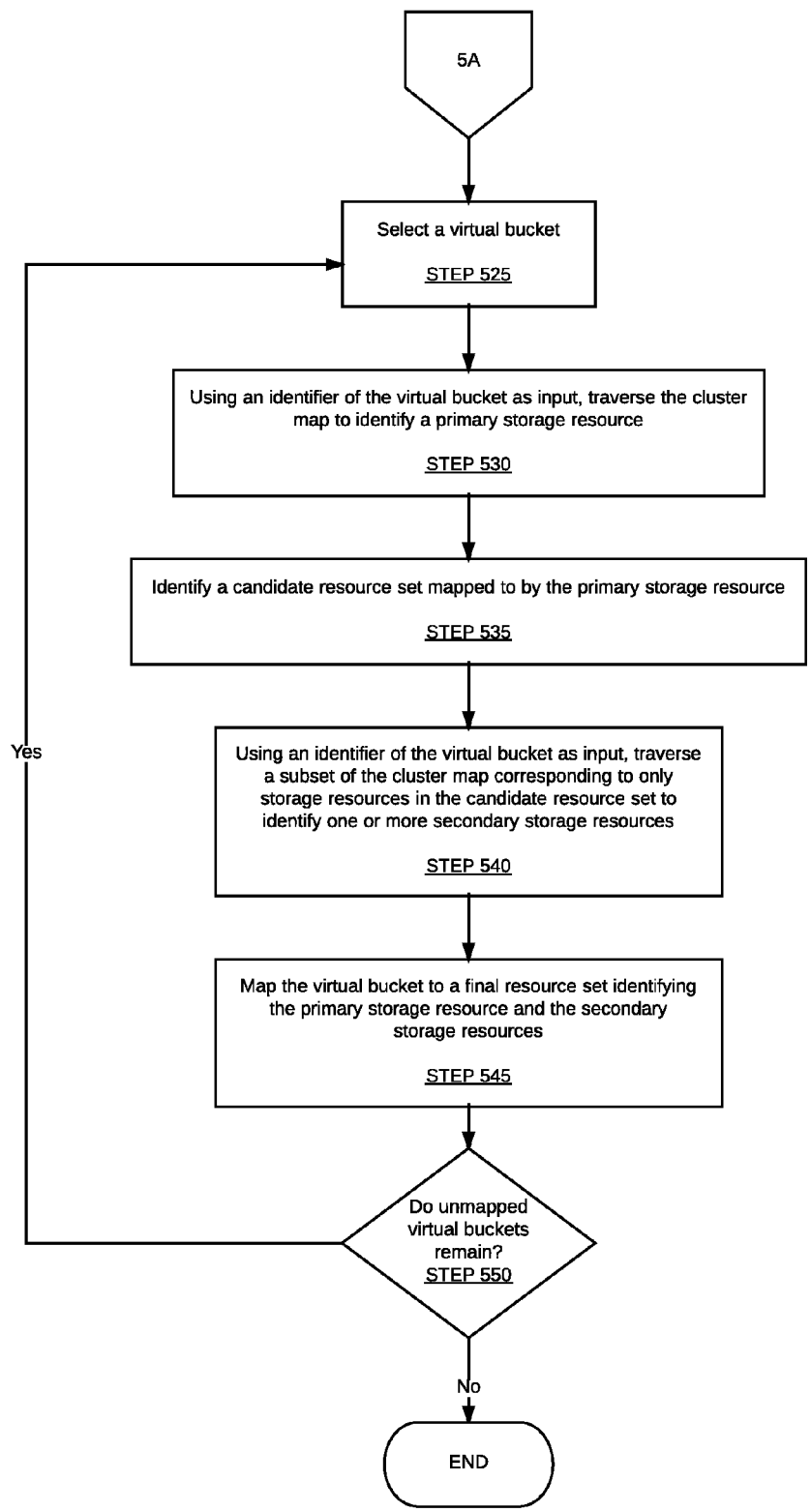

FIGS. 5A and 5B show a flowchart of a method for distributed data storage. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 5A and 5B should not be construed as limiting the scope of the invention.

In STEP 500, an RDF value is obtained. The RDF value may be a predefined value assigned by an administrator or may be included in a rebalance request received from a client or other entity. In STEP 505, a cluster map representing a set of storage resources is identified. In one or more embodiments of the invention, the cluster map is constructed as a representation of the topology of a storage cluster at a given point in time. For example, the cluster map may be a hierarchical cluster tree (hierarchical cluster tree (299) of FIG. 2, discussed above). As the topology changes, the cluster map may be modified at one or more predefined times, in response to detecting the change in the topology, and/or in response to input from a system administrator.

In STEP 510, a storage resource is selected. The storage resources may be selected according to any predefined selection protocol, or at random, in accordance with various embodiments of the invention. STEPS 510-520 may be performed in order to map each storage resource to a candidate resource set. If the mapping is designed to be bi-directional, once a primary storage resource is mapped to a candidate resource set, all other storage resources identified by the candidate resource set are also mapped (i.e., without performing an iteration of the data distribution algorithm for the other storage resources). Thus, in the case of bi-directional mapping, the number of iterations of STEPS 510-520 can be significantly less than performing uni-directional mapping. Although the RDF may still be restricted using uni-directional mapping, uni-directional mapping may result in a higher effective RDF than the identified RDF value.

In STEP 515, using an identifier of the storage resource as input, the cluster map is traversed to map the selected storage resource to a candidate resource set. In one or more embodiments of the invention, this mapping involves using a data distribution algorithm (e.g., the CRUSH algorithm) to select RDF−1 storage resources, such that the summation of the primary storage resource and the candidate resource set is equal to the RDF value.

In STEP 520, it is determined whether unmapped storage resources remain. If it is determined that unmapped storage resources remain, the process proceeds to STEP 510. If it is determined that unmapped storage resources do not remain, the process proceeds to STEP 525 of FIG. 5B.

It should be noted that, in one or more embodiments of the invention, the steps of FIG. 5A are data independent. Thus, it may be possible and/or advantageous to perform the steps of FIG. 5A prior to receiving any storage requests. Any variation of the given steps may be used, in accordance with various embodiments of the invention.

Moving on to FIG. 5B, in STEP 525, a virtual bucket is selected. The virtual bucket may be selected according to any predefined selection protocol, or at random, in accordance with various embodiments of the invention. In one or more embodiments of the invention, the number of virtual buckets may be modified by a distribution engine (e.g., distribution engine (100) of FIG. 1, discussed above) in response to user input, a predefined trigger, and/or detection of an event. For example, the distribution engine may be configured to identify a threshold number of storage resources defined by a trigger. In this example, the distribution engine may be configured to detect that the number of storage resources in the storage cluster has exceeded the threshold number. In response to this detection, the distribution engine may be configured to increase the number of virtual buckets by a predefined amount, by a predefined percentage, and/or to a number that is proportional to the increase in the size of the topology. In another example, the distribution engine may be configured to identify a threshold number of storage resources associated with a second trigger. In this example, the distribution engine may be configured to detect that the number of storage resources in the storage cluster has fallen below the threshold number. In response to this detection, the distribution engine may be configured to decrease the number of virtual buckets by a predefined amount, by a predefined percentage, and/or to a number that is proportional to the decrease in the size of the topology. The comparison of one or more of the aforementioned thresholds may occur periodically, in response to a rebalance request, and/or on-demand, in accordance with various embodiments of the invention.

In STEP 530, using an identifier of the virtual bucket as input, the cluster map is traversed to identify a primary storage resource. In this iteration, the data distribution algorithm iterated with a selection value of n=1, such that only one storage resource is selected as the primary storage resource.

In STEP 535, a candidate resource set mapped to by the primary storage resource is identified. In one or more embodiments of the invention, the mapping of each storage resource in the storage cluster to a candidate resource set may have been pre-computed. This mapping may be identified in a repository accessible by a distribution engine or other relevant process.

In STEP 540, using an identifier of the virtual bucket as input, a subset of the cluster map corresponding to only storage resources in the candidate resource set is traversed to identify one or more secondary storage resources. In one or more embodiments of the invention, any other data structure representing the topology of the storage cluster may be used and modified to represent only the candidate resource set (depending on the data distribution algorithm used). In one example, a hierarchical cluster tree may be pruned to remove all storage clusters not identified by the candidate resource set. All remaining nodes which do not reside on a path of at least on remaining storage resource may also be pruned from the hierarchical cluster tree. The resulting tree may then be used to perform the traversal and to select a number (e.g., RF−1) of secondary storage resources for storing data mapped to the virtual bucket (e.g., the virtual bucket selected in STEP 525). The primary storage resource and the identified secondary storage resources may be collectively referred to as the final resource set. In STEP 545, the virtual bucket is mapped to the final resource set. In one or more embodiments of the invention, the size of the final resource set is equal to the replication factor (RF).

In STEP 550, it is determined whether unmapped virtual buckets remain. If it is determined that unmapped virtual buckets remain, the process proceeds to STEP 525. If it is determined that unmapped virtual buckets do not remain, the process ends.

Figure 6:
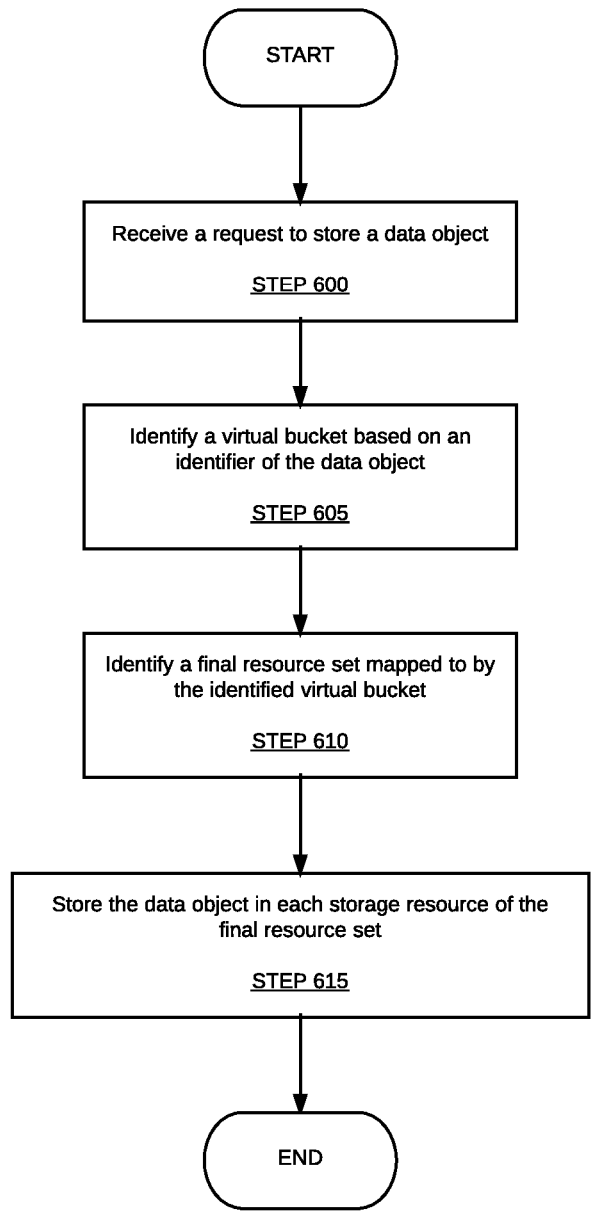

FIG. 6 shows a flowchart of a method for distributed data storage. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6 should not be construed as limiting the scope of the invention.

In STEP 600, a request to store a data object is received. The request may be received in parallel with any number of other requests, and may be sent from a client to a frontend module (e.g., frontend module (105) of FIG. 1, discussed above), in accordance with various embodiments of the invention.

In STEP 605, a virtual bucket is identified based on an identifier of the data object. The data object may be hashed to the virtual bucket based on an identifier of the data object and/or any other data uniquely identifying the data and/or request. In this way, in one or more embodiments of the invention, incoming requests may be grouped into virtual buckets which are then mapped to one or more storage resources for distributed storage.

In STEP 610, a final resource set mapped to by the identified virtual bucket is identified. In one or more embodiments of the invention, the final resource set is a pre-computed set of storage resources for storing data mapped to the virtual bucket. In STEP 615, a replica of the data object is sent to each storage resource of the final resource set for storage.

The following section describes various examples of the invention. The examples are included to aid in the understanding of the invention but are not intended to limit the scope of the invention.

In one example, a distributed storage system includes a storage cluster, a frontend module, and a distribution engine. In this example, the storage includes a set of hard disk drives (HDDs) distributed across a network of computing devices in two datacenters. The distribution engine creates a hierarchical cluster tree to represent the topology of the storage cluster.

Continuing the example, a system administrator defines an RDF value and a replication factor (RF), and creates a set of placement rules requiring that replicas of the same data object cannot reside in the same rack of a datacenter. Another placement rule requires that replicas of a given data object cannot all reside in the same datacenter. The RDF value, RF, and the placement rules are obtained from the administrator by the frontend module. Using the placement rules, the hierarchical cluster tree, and the CRUSH algorithm, the distribution engine begins by iterating through each HDD in the cluster to map the HDD to a candidate resource set. The distribution engine uses a unique identifier of the HDD as an input and chooses a selection size equal to a predefined RDF value obtained from an administrator of the system. The distribution engine traverses the hierarchical cluster tree based on these inputs and identifies a candidate resource set for each storage resource. Each storage resource is thus matched to a candidate resource set of other storage objects in the cluster. The size of the candidate resource set is equal to the RDF−1. FIG. 7A shows an example of mappings between storage resources and candidate resource sets in accordance with one or more embodiments of the invention.

Continuing the example, the frontend module then receives configuration data from an administrator of the system. The configuration data includes a request to create 100,000 virtual buckets. The distribution engine then creates an array of 100,000 virtual buckets and begins a second iteration of the CRUSH algorithm for each virtual bucket. The distribution engine uses an identifier of the virtual bucket as input and identifies a single storage resource of the cluster as an output. This single storage resource is then tagged as the primary storage resource of the virtual bucket. FIG. 7B shows an example of mappings between virtual buckets and primary storage resources in accordance with one or more embodiments of the invention.

Continuing the example, the distribution engine identifies the candidate resource set corresponding to each of the primary storage resources. For each primary storage resource, based on the candidate resource set, the distribution engine prunes the hierarchical cluster tree to remove all storage resources not included in the corresponding candidate resource set. The pruned hierarchical cluster tree is used to perform another iteration of the CRUSH algorithm. Using the identifier of the virtual bucket as input, the distribution engine traverses the modified hierarchical cluster tree to identify RF−1 secondary storage resources among the candidate resource set. A final resource set including the primary storage resource and the identified secondary storage resources is mapped to from the virtual bucket.

Continuing the example, at this point, the distribution engine begins receiving storage requests from multiple clients. Each write request includes a data object which is then hashed by the distribution engine to one of the virtual buckets. The data object is then sent to each of the storage resources of the final resource set of the virtual bucket for storage.

Figure 8:
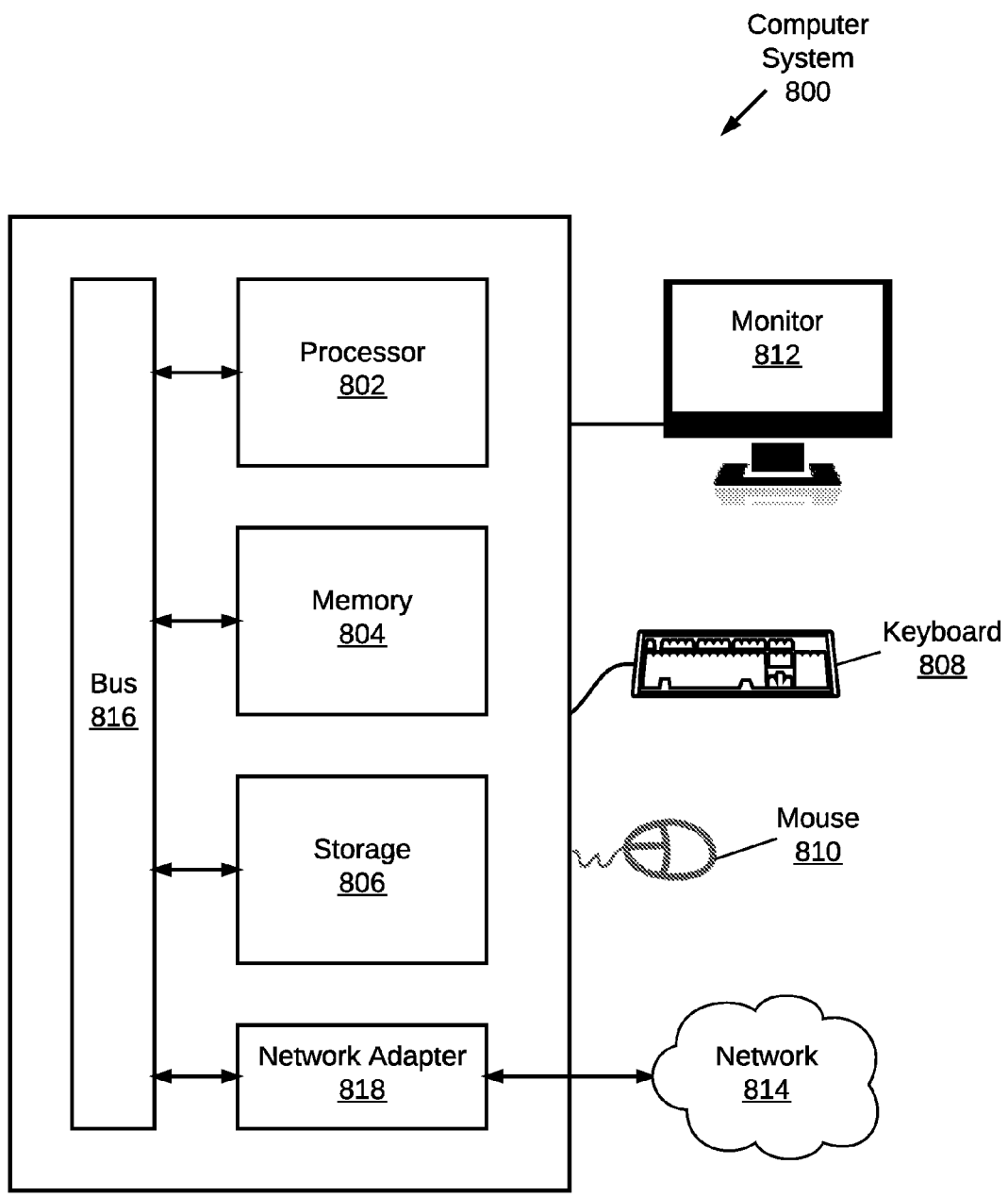
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) (such as a central processing unit (CPU), integrated circuit, hardware processor, etc.), associated memory (804) (e.g., RAM, cache memory, flash memory, etc.), a storage device (806) (e.g., a hard disk, an optical drive such as a compact disk drive or digital video disk (DVD) drive, a flash memory stick, etc.), a network adapter (818), and numerous other elements and functionalities typical of today's computers (not shown). One or more components of the computer system (800) may be communicatively connected by a bus (816). The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via the network adapter (818). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g., frontend module (105), distribution engine (100), and/or one or more components of the storage cluster (110), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By performing various modifications to a traditional data distribution algorithm, it may be possible to restrict the distribution of commonly mapped data based on an RDF value. Furthermore, by mapping data to a set of virtual buckets, it may be possible to precompute a deterministic mapping between each virtual bucket and a set of storage resources for replicated storage. This precomputed mapping may then be used to rapidly read, write, and modify data in the storage cluster, while maintaining a desired level of distribution locality. Embodiments of the invention provide functionality to select and/or dynamically modify the number of nodes in a cluster which can potentially share data with other nodes (via the RDF value), while minimizing the rebalancing requirements associated with any potential changes to the topology of the storage cluster. Furthermore, by lowering the RDF value, it may be possible to significantly lower the probability of data loss in scenarios where the replication factor is also low.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data storage, comprising:
   identifying a first virtual bucket of a plurality of virtual buckets;
   for each virtual bucket of the plurality of virtual buckets:
      using an identifier of the virtual bucket and a cluster map representing a plurality of storage resources to identify a primary storage resource;
      identifying a candidate resource set mapped to by the primary storage resource;
      using an identifier of the virtual bucket to traverse a subset of the cluster map corresponding to storage resources in the candidate resource set to identify one or more secondary storage resources; and
      mapping the virtual bucket to a final resource set identifying the primary storage resource and the secondary storage resources;
   identifying a data object associated with a storage request;
   selecting a particular virtual bucket of the plurality of virtual buckets based on an identifier of the data object;
   identifying a corresponding final resource set mapped to by the selected virtual bucket; and
   storing the data object in each storage resource of the final resource set.

2. The method of claim 1, wherein
   identifying the primary storage resource of the plurality of storage resources for a virtual bucket includes:
      using the identifier of the virtual bucket as an input to a data distribution algorithm using the cluster map, wherein the cluster map is a hierarchical cluster tree representing a topology of the plurality of storage resources.

3. The method of claim 1, wherein selecting the particular virtual bucket includes
   hashing the first data object and using the hash value to determine a virtual bucket of the plurality of virtual buckets.

4. The method of claim 1, wherein the cluster map depicts a snapshot of a topology of a distributed storage system, and wherein the method further comprises:
   identifying a subsequent snapshot of the topology; and
   generating, based on the subsequent snapshot, a modified cluster map representing a modified plurality of storage resources;
   traversing the modified cluster map to identify a modified plurality of candidate resource sets; and
   identifying, based on the modified plurality of candidate resource sets, a modified plurality of final resource sets mapped to by the plurality of virtual buckets, wherein the modified plurality of final resource sets are used for future data storage requests.

5. The method of claim 1, further comprising:
   identifying a replication factor designating a number of replicas to be made for each stored data object, wherein the replication factor is equal to a size of the first final resource set.

6. The method of claim 1, further comprising:
   receiving a plurality of placement rules requiring that replicas corresponding to the same data object be stored on storage resources residing in one selected from a group consisting of separate physical server cabinets, separate electrical circuits, separate rows of physical server cabinets, and separate storage shelves, wherein traversing the cluster map to map the storage resource to a candidate resource set is based on the plurality of placement rules.

7. The method of claim 1, wherein the mapping of storage resources to candidate resource sets is bi-directional.

8. The method of claim 1, further comprising:
identifying a target balance threshold for the primary storage resource; and
updating a current number of mappings to the primary storage resource, wherein the data object is sent to the storage resources of the final resource set for storage.

9. The method of claim 8, further comprising:
receiving, after sending the data object for storage, a request to store a new data object;
identifying the primary storage resource based on an identifier of the second data object;
identifying the updated current number of mappings to the primary storage resource;
determining that the updated current number of mappings to the primary storage resource exceeds the target balance threshold; and
generating a modified cluster map excluding the primary storage device, wherein the modified cluster map is used to identify an alternate primary storage resource for storing the new data object.

10. A distributed storage system, comprising:
a computer processor;
a cluster map representing a plurality of storage resources;
a distribution engine executing on the computer processor and configured to:
identifying a first virtual bucket of a plurality of virtual buckets;
for each virtual bucket of the plurality of virtual buckets:
using an identifier of the virtual bucket and the cluster map to identify a primary storage resource;
identifying a candidate resource set mapped to by the primary storage resource;
using an identifier of the virtual bucket to traverse a subset of the cluster map corresponding to storage resources in the candidate resource set to identify one or more secondary storage resources; and
mapping the virtual bucket to a final resource set identifying the primary storage resource and the secondary storage resources;
a frontend module configured to:
receive a request to store a data object;
selecting a particular virtual bucket of the plurality of virtual buckets based on an identifier of the data object;
identifying a corresponding final resource set mapped to by the selected virtual bucket; and
storing the data object in each storage resource of the final resource set.

11. The system of claim 10, wherein
identifying the primary storage resource of the plurality of storage resources for a virtual bucket includes:
using the identifier of the virtual bucket as an input to a data distribution algorithm using the cluster map, wherein the cluster map is a hierarchical cluster tree representing a topology of the plurality of storage resources.

12. The system of claim 10, wherein selecting the particular virtual bucket includes hashing the data object and using the hash value to determine a virtual bucket of the plurality of virtual buckets.

13. The system of claim 12, wherein the frontend module is further configured to:
obtain a replication factor designating a number of replicas to be made for each stored data object, wherein the replication factor is equal to a size of the final resource set.

14. The system of claim 12, wherein the mapping of storage resources to candidate resource sets is uni-directional, and wherein the uni-directional mapping results in a higher effective RDF value than the RDF value.

15. A non-transitory computer readable medium comprising computer readable program code for:
identifying a first virtual bucket of a plurality of virtual buckets;
for each virtual bucket of the plurality of virtual buckets:
using an identifier of the virtual bucket and a cluster map representing a plurality of storage resources to identify a primary storage resource;
identifying a candidate resource set mapped to by the primary storage resource;
using an identifier of the virtual bucket to traverse a subset of the cluster map corresponding to storage resources in the candidate resource set to identify one or more secondary storage resources; and
mapping the virtual bucket to a final resource set identifying the primary storage resource and the secondary storage resources;
identifying a data object associated with a storage request;
selecting a particular virtual bucket of the plurality of virtual buckets based on an identifier of the data object;
identifying a corresponding final resource set mapped to by the selected virtual bucket; and
storing the data object in each storage resource of the final resource set.

16. The non-transitory computer readable medium of claim 15, wherein
identifying the primary storage resource of the plurality of storage resources for a virtual bucket includes:
using the identifier of the virtual bucket as an input to a data distribution algorithm using the cluster map, wherein the cluster map is a hierarchical cluster tree representing a topology of the plurality of storage resources.

17. The non-transitory computer readable medium of claim 15, wherein selecting the particular virtual bucket includes
for hashing the data object and using the hash value to determine a virtual bucket of the plurality of virtual buckets.

18. The method of claim 1, wherein the mapping of the primary storage resource to the candidate resource set is bi-directional such that the primary storage resource is a candidate resource of another storage resource of the candidate resource set.

19. The method of claim 1, wherein the candidate resource set has a size depending on a resource distribution factor value for the distributed storage system.

* * * * *

UNITED STATES PATENT AND TRADEMARK OFFICE
CERTIFICATE OF CORRECTION

PATENT NO. : 9,851,911 B1
APPLICATION NO. : 15/096987
DATED : December 26, 2017
INVENTOR(S) : Peter Schuller et al.

It is certified that error appears in the above-identified patent and that said Letters Patent is hereby corrected as shown below:

In the Claims

At Column 18, Line 2, in Claim 12, after "the" insert -- first --.

At Column 18, Line 53, in Claim 17, delete "for hashing the data" and insert -- hashing the data --, therefor.

Signed and Sealed this
Tenth Day of July, 2018

Andrei Iancu
*Director of the United States Patent and Trademark Office*